(12) United States Patent
Chen et al.

(10) Patent No.: US 10,432,506 B2
(45) Date of Patent: Oct. 1, 2019

(54) DATA PROCESSING METHOD AND APPARATUS

(71) Applicant: HUAWEI TECHNOLOGIES CO., LTD., Shenzhen (CN)

(72) Inventors: Xianbo Chen, Hangzhou (CN); Honghui Yuan, Hangzhou (CN); Binbin Yao, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 16 days.

(21) Appl. No.: 15/824,032

(22) Filed: Nov. 28, 2017

(65) Prior Publication Data

US 2018/0083864 A1 Mar. 22, 2018

Related U.S. Application Data

(63) Continuation of application No. PCT/CN2016/083471, filed on May 26, 2016.

(30) Foreign Application Priority Data

May 29, 2015 (CN) .......................... 2015 1 0288092

(51) Int. Cl.
*H04L 12/725* (2013.01)
*G06F 9/48* (2006.01)
(Continued)

(52) U.S. Cl.
CPC .......... *H04L 45/306* (2013.01); *G06F 9/4881* (2013.01); *G06F 9/546* (2013.01); *H04L 45/54* (2013.01); *H04L 45/64* (2013.01)

(58) Field of Classification Search
CPC ....... H04L 45/306; H04L 45/54; H04L 45/64; G06F 9/4881; G06F 9/546
See application file for complete search history.

(56) References Cited

U.S. PATENT DOCUMENTS 7,925,863 B2 4/2011 Hundley
2015/0172104 A1* 6/2015 Brandwine ............. H04L 69/40
709/224
(Continued)

FOREIGN PATENT DOCUMENTS

CN 101262352 A 9/2008
CN 102769574 A 11/2012
(Continued)

OTHER PUBLICATIONS

Foreign Communication From a Counterpart Application, European Application No. 16802496.6, Extended European Search Report dated Mar. 6, 2018, 9 pages.
(Continued)

*Primary Examiner* — Benjamin H Elliott, IV
(74) *Attorney, Agent, or Firm* — Conley Rose, P.C.

(57) ABSTRACT

A data processing method is disclosed, the method includes: receiving a request message that is sent from a host service layer and transparently transmitted through a host driver layer, where the request message includes at least one acceleration type identifier and to-be-acceleratedly-processed service data, and each acceleration type identifier corresponds to one type of accelerated processing; and performing at least one type of accelerated processing in a one-to-one correspondence with the at least one acceleration type identifier on the service data. In the method, interaction between the host service layer and the hardware processing unit does not need coordination of a specialized driver, so that dependence on a specific underlying driver for a service layer may be shielded.

20 Claims, 10 Drawing Sheets

(51) Int. Cl.
      *H04L 12/741*     (2013.01)
      *H04L 12/715*     (2013.01)
      *G06F 9/54*        (2006.01)

(56) References Cited

U.S. PATENT DOCUMENTS

| | | | | |
|---|---|---|---|---|
| 2015/0249672 | A1* | 9/2015 | Burns | H04L 12/66 |
| | | | | 726/4 |
| 2017/0237672 | A1* | 8/2017 | Dalal | G06F 13/1652 |
| | | | | 370/235 |
| 2018/0083864 | A1* | 3/2018 | Chen | G06F 9/4881 |

FOREIGN PATENT DOCUMENTS

| | | |
|---|---|---|
| CN | 102932458 A | 2/2013 |
| CN | 103399758 A | 11/2013 |
| CN | 104899085 A | 9/2015 |
| WO | 2015042684 A1 | 4/2015 |

OTHER PUBLICATIONS

International Search Report and Written Opinion (including English translation) issued in corresponding International Application No. PCT/CN2016/083471, dated Aug. 23, 2016, 21 pages.

First Office Action (including English translation) issued in corresponding Chinese Patent Application No. 201510288092.2, dated Nov. 1, 2017, 9 pages.

\* cited by examiner

DATA PROCESSING METHOD AND APPARATUS

CROSS-REFERENCE TO RELATED APPLICATIONS

This application is a continuation of International Application No. PCT/CN2016/083471, filed on May 26, 2016, which claims priority to Chinese Patent Application No. 201510288092.2, filed on May 29, 2015, The disclosures of the aforementioned applications are hereby incorporated by reference in their entireties.

TECHNICAL FIELD

The present disclosure relates to the field of data processing technologies, and in particular, to a data processing method and a data processing apparatus.

BACKGROUND

With development of Internet technologies, various new types of services continuously develop, diverse network data types continuously emerge, and network traffic soars, thereby imposing a stricter requirement on a processing capability of a processing device. To improve the processing capability, increasingly more current processing devices begin to use a hardware processing unit (such as an FPGA or an ASIC) to accelerate some services.

In a current "CPU+FPGA"-based hardware acceleration solution, the CPU (may be considered as "a host") is configured to execute code at a service layer (may be usually referred to as "an application layer" or "an upper layer") and in an underlying driver. The service layer is used to generate original acceleration data, of which the process need to be accelerated, or used to receive original acceleration data scheduled from another service layer. The underlying driver is configured to cooperate with the service layer to complete work, such as parsing a scheduled instruction, data conversion, data encapsulation, or data transmission. The FPGA is configured to receive data delivered from the underlying driver, complete accelerated processing on the data, and return processed data to the service layer by using the underlying driver.

However, in this solution, acceleration for different service types needs to depend on the underlying driver. That is, specialized underlying drivers that match different service types are used for the service layer to accelerate FPGAs in corresponding functions. Therefore, in the existing technical solution, each service type that needs acceleration needs a customized underlying driver, and mobility and flexibility are poor.

SUMMARY

Embodiments of the present disclosure provide a data processing method and apparatus, used to resolve a prior-art problem of poor mobility and flexibility caused by a customized underlying driver required in each service acceleration scenario.

According to a first aspect, an embodiment of the present disclosure provides a data processing method, applied to a scenario in which a hardware processing unit accelerates service data sent by a host, and the method is executed by the hardware processing unit, and includes:

receiving a request message that is sent from a host service layer and transparently transmitted through a host driver layer, where the request message includes at least one acceleration type identifier and to-be-acceleratedly-processed service data, and each acceleration type identifier corresponds to one type of accelerated processing; and performing at least one type of accelerated processing in a one-to-one correspondence with the at least one acceleration type identifier on the service data.

With reference to the first aspect, in a first possible implementation manner, the request message includes multiple acceleration type identifiers, the request message further includes an acceleration sequence identifier in a one-to-one correspondence with each acceleration type identifier, and the acceleration sequence identifiers are used to indicate an acceleration processing order; and the performing at least one type of accelerated processing in a one-to-one correspondence with the at least one acceleration type identifier on the service data includes:

performing multiple types of accelerated processing in a one-to-one correspondence with the multiple acceleration type identifiers on the service data according to the order indicated by the multiple acceleration sequence identifiers.

With reference to the first aspect and/or the first possible implementation manner, in a second possible implementation manner, the hardware processing unit includes a receiving module, an inter-group routing module, and at least one acceleration processing group;

the inter-group routing module includes an inter-group routing table, where the inter-group routing table includes a correspondence between an acceleration type identifier and an acceleration processing group;

the receiving a request message that is sent from a host service layer and transparently transmitted through a host driver layer includes: receiving, by the receiving module, the request message that is sent from the host service layer and transparently transmitted through the host driver layer; and the performing at least one type of accelerated processing in a one-to-one correspondence with the at least one acceleration type identifier on the service data includes:

receiving, by the inter-group routing module, the request message sent by the receiving module;

parsing, by the inter-group routing module, the request message to obtain the acceleration type identifier;

forwarding, by the inter-group routing module, the request message to a destination acceleration processing group according to the parsed-out acceleration type identifier and the inter-group routing table; and performing, by the destination acceleration processing group, accelerated processing on the service data.

With reference to the first aspect and/or the first possible implementation manner and/or the second possible implementation manner, in a third possible implementation manner, the acceleration processing group includes a parsing module, an intra-group routing module, and at least one acceleration processing module, where the at least one acceleration processing module is configured to perform different types of accelerated processing on a same service;

the intra-group routing module includes an intra-group routing table, where the intra-group routing table includes a correspondence between an acceleration type identifier and an acceleration processing module; and the performing, by the destination acceleration processing group, accelerated processing on the service data includes:

parsing, by a parsing module of the destination acceleration processing group, the request message, caching the service data, and generating an internally forwarded message according to a parsing result, where the internally forwarded message includes the acceleration type identifier and a cache address of the service data;

sending, by the parsing module, the internally forwarded message to an intra-group routing module of the destination acceleration processing group;

sending, by the intra-group routing module, the internally forwarded message to a destination acceleration processing module according to the acceleration type identifier and the intra-group routing table; and obtaining, by the destination acceleration processing module, the service data according to the cache address included in the internally forwarded message, and performing accelerated processing on the service data.

With reference to the first aspect and/or the first possible implementation manner and/or the second possible implementation manner and/or the third possible implementation manner, in a fourth possible implementation manner, when the internally forwarded message includes the acceleration sequence identifiers, the performing, by the destination acceleration processing group, accelerated processing on the service data further includes:

caching, by the destination acceleration processing module, acceleratedly processed service data, and notifying the intra-group routing module; and sending, by the intra-group routing module, the internally forwarded message to a next destination acceleration processing module according to the acceleration sequence identifiers, to enable the next destination acceleration processing module to perform accelerated processing on the data cached by the destination acceleration processing module until the end of the acceleration order indicated by the acceleration sequence identifiers.

With reference to the first aspect and/or the first possible implementation manner and/or the second possible implementation manner and/or the third possible implementation manner and/or the fourth possible implementation manner, in a fifth possible implementation manner, the method further includes:

caching, by the destination acceleration processing module, processed service data;

when all the service data is acceleratedly processed, reading, by the destination intra-group routing module, the cached processed service data;

generating, by the destination intra-group routing module, a feedback message corresponding to the request message according to the processed service data; and sending, by the destination intra-group routing module, the feedback message to the inter-group routing module, so that the inter-group routing module sends the feedback message to the host.

With reference to the first aspect and/or the first possible implementation manner and/or the second possible implementation manner and/or the third possible implementation manner and/or the fourth possible implementation manner and/or the fifth possible implementation manner, in a six possible implementation manner, the feedback message and the request message have a same message structure, and the message structure includes a message type field used to distinguish between the feedback message and the request message.

With reference to the first aspect and/or the first possible implementation manner and/or the second possible implementation manner and/or the third possible implementation manner and/or the fourth possible implementation manner and/or the fifth possible implementation manner and/or the six possible implementation manner, in a seventh possible implementation manner, a field area and a data area are set in the request message, the field area includes a service header field and a control header field, the service header field includes the acceleration type identifier, and the data area is used to carry the service data.

With reference to the first aspect and/or the first possible implementation manner and/or the second possible implementation manner and/or the third possible implementation manner and/or the fourth possible implementation manner and/or the fifth possible implementation manner and/or the six possible implementation manner and/or the seventh possible implementation manner, in an eighth possible implementation manner, an aging switch and an aging time are further configured in the inter-group routing table, and the method further includes:

when the aging switch of the inter-group routing table is enabled and the aging time elapses, reporting, by the inter-group routing module, to the host, to request the host to configure a new inter-group routing table.

With reference to the first aspect and/or the first possible implementation manner and/or the second possible implementation manner and/or the third possible implementation manner and/or the fourth possible implementation manner and/or the fifth possible implementation manner and/or the six possible implementation manner and/or the seventh possible implementation manner and/or the eighth possible implementation manner, in a ninth possible implementation manner, an aging switch and an aging time are further configured in the intra-group routing table, and the method further includes:

when the aging switch of the intra-group routing table is enabled and the aging time elapses, reporting, by the intra-group routing module, to the host, to request the host to configure a new intra-group routing table.

According to a second aspect, an embodiment of the present disclosure further provides a data processing apparatus, applied to a scenario in which service data sent by a host is accelerated, and the apparatus includes:

a receiving module, configured to receive a request message that is sent from a host service layer and transparently transmitted through a host driver layer, where the request message includes at least one acceleration type identifier and to-be-acceleratedly-processed service data, and each acceleration type identifier corresponds to one type of accelerated processing; and a processing module, configured to perform at least one type of accelerated processing in a one-to-one correspondence with the at least one acceleration type identifier on the service data received by the receiving module.

With reference to the second aspect, in a first possible implementation manner, the request message includes multiple acceleration type identifiers, the request message further includes an acceleration sequence identifier in a one-to-one correspondence with each acceleration type identifier, and the acceleration sequence identifiers are used to indicate an acceleration processing order; and the processing module is further configured to perform accelerated processing corresponding to each of the multiple acceleration type identifiers on the service data according to the order indicated by the multiple acceleration sequence identifiers.

With reference to the second aspect and/or the first possible implementation manner, in a second possible implementation manner, the hardware processing unit includes an inter-group routing module and at least one acceleration processing group;

the inter-group routing module includes an inter-group routing table, where the inter-group routing table includes a correspondence between an acceleration type identifier and an acceleration processing group; and the inter-group routing module is configured to receive the request message sent by the receiving module, parse the request message to obtain the acceleration type identifier, and forward the request message to a destination acceleration processing group according to the parsed-out acceleration type identifier and the inter-group routing table; and the acceleration processing group is configured to perform accelerated processing on the service data.

With reference to the second aspect and/or the first possible implementation manner and/or the second possible implementation manner, in a third possible implementation manner, the acceleration processing group includes a parsing module, an intra-group routing module, and at least one acceleration processing module, where the at least one acceleration processing module is configured to perform different types of accelerated processing on a same service;

the parsing module is configured to parse the request message sent by the inter-group routing module, cache the service data, generate an internally forwarded message according to a parsing result, where the internally forwarded message includes the acceleration type identifier and a cache address of the service data, and send the internally forwarded message to the intra-group routing module;

the intra-group routing module includes an intra-group routing table, where the intra-group routing table includes a correspondence between an acceleration type identifier and an acceleration processing module; the intra-group routing module is configured to send the internally forwarded message received from the parsing module to a destination acceleration processing module according to the acceleration type identifier and the intra-group routing table; and the acceleration processing module is configured to obtain the service data according to the cache address included in the internally forwarded message received from the intra-group routing module, and perform accelerated processing on the service data.

With reference to the second aspect and/or the first possible implementation manner and/or the second possible implementation manner and/or the third possible implementation manner, in a fourth possible implementation manner, when the internally forwarded message includes the acceleration sequence identifiers, the acceleration processing module is further configured to cache acceleratedly processed service data, and notify the intra-group routing module; and after receiving a notification sent by the acceleration processing module, the intra-group routing module is further configured to send the internally forwarded message to a next destination acceleration processing module according to the acceleration sequence identifiers, to enable the next destination acceleration processing module to perform accelerated processing on the data cached by the destination acceleration processing module until the end of the acceleration order indicated by the acceleration sequence identifiers.

With reference to the second aspect and/or the first possible implementation manner and/or the second possible implementation manner and/or the third possible implementation manner and/or the fourth possible implementation manner, the acceleration processing module is further configured to cache processed service data; and when all the service data is acceleratedly processed, the intra-group routing module is further configured to read the processed service data cached by the acceleration processing module, generate a feedback message corresponding to the request message according to the processed service data, and send the feedback message to the inter-group routing module, so that the inter-group routing module sends the feedback message to the host.

With reference to the second aspect and/or the first possible implementation manner and/or the second possible implementation manner and/or the third possible implementation manner and/or the fourth possible implementation manner and/or the fifth possible implementation manner, in a six possible implementation manner, the feedback message and the request message have a same message structure, and the message structure includes a message type field used to distinguish between the feedback message and the request message.

With reference to the second aspect and/or the first possible implementation manner and/or the second possible implementation manner and/or the third possible implementation manner and/or the fourth possible implementation manner and/or the fifth possible implementation manner and/or the six possible implementation manner, in a seventh possible implementation manner, a field area and a data area are set in the request message, the field area includes a service header field and a control header field, the service header field includes the acceleration type identifier, and the data area is used to carry the service data.

With reference to the second aspect and/or the first possible implementation manner and/or the second possible implementation manner and/or the third possible implementation manner and/or the fourth possible implementation manner and/or the fifth possible implementation manner and/or the six possible implementation manner and/or the seventh possible implementation manner, in an eighth possible implementation manner, an aging switch and an aging time are further configured in the inter-group routing table; and when the aging switch of the inter-group routing table is enabled and the aging time elapses, the inter-group routing module is further configured to report to the host, to request the host to configure a new inter-group routing table.

With reference to the second aspect and/or the first possible implementation manner and/or the second possible implementation manner and/or the third possible implementation manner and/or the fourth possible implementation manner and/or the fifth possible implementation manner and/or the six possible implementation manner and/or the seventh possible implementation manner and/or the eighth possible implementation manner, in a ninth possible implementation manner, an aging switch and an aging time are further configured in the intra-group routing table; and when the aging switch of the intra-group routing table is enabled and the aging time elapses, the intra-group routing module is further configured to report to the host, to request the host to configure a new intra-group routing table.

Compared with other examples, the embodiments of the present disclosure include the following advantages:

In the embodiments of the present disclosure, a message structure is agreed between a host service layer and a hardware processing unit, so that a message can be transparently transmitted through a host driver layer, and then directly sent by the host to the hardware processing unit, and the hardware processing unit performs accelerated processing according to a corresponding identifier in the message. Therefore, in the method, interaction between the host service layer and the hardware processing unit does not need coordination of a specialized driver, and dependence on a specific underlying driver for a service layer may be shielded. In this method, the hardware processing unit may run on different service platforms, and have strengthened logic interoperability, thereby improving mobility and flexibility in a service processing process.

DETAILED DESCRIPTION

To make the objectives, features and advantages of the present disclosure more comprehensible, the present disclosure is further illustrated in detail in the following with reference to the accompanying drawings and specific embodiments.

Figure 1:
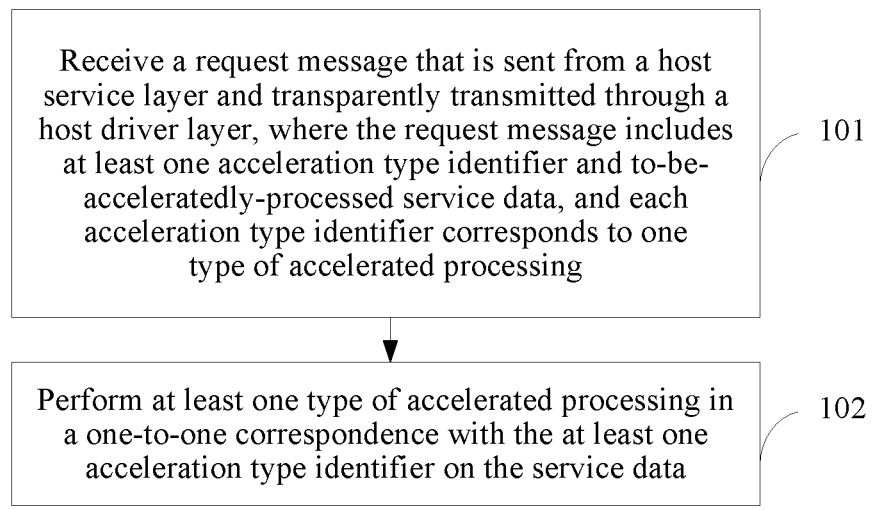
FIG. 1 is a step flowchart of an embodiment of a data processing method according to the present disclosure.

Referring to FIG. 1, FIG. 1 is a flowchart of a data processing method according to an embodiment of the present disclosure.

The method is applied to a scenario in which a hardware processing unit accelerates service data sent by a host. The host is usually referred to a system that includes one or more CPUs, and is configured to use the CPU to execute software code stored in a memory, so as to implement functions of a service layer and a driver layer. The hardware processing unit is referred to a unit implemented by a hardware component such as an FPGA and an ASIC, and is configured to process (mainly acceleratedly process) data sent from a host service layer. The host and the hardware processing unit are connected by using an interconnect port. The data processing method in this embodiment of the present disclosure is completed by the hardware processing unit, and may include the following steps.

Step 101: Receive a request message that is sent from the host service layer and transparently transmitted through the host driver layer, where the request message includes at least one acceleration type identifier and to-be-acceleratedly-processed service data, and each acceleration type identifier corresponds to one type of accelerated processing.

In this step, the "transparent transmission" indicates that when the request message passes through the host driver layer, the driver layer does not modify content of the request message but only encapsulates and sends the message to the hardware processing unit. In this process, for any acceleration task, a function of the driver layer is to complete only encapsulation and transmission of the request message, and content parsing and modification are not performed. Therefore, in this embodiment, even though the hardware processing unit changes, the function of the driver layer does not need to be changed, and dependence on a specific underlying driver for a service layer may be shielded.

In this embodiment, the "request message" refers to a request message that is agreed between the host and the hardware processing unit and has a fixed message structure. The request message sent from the host service layer may be "transparently transmitted" to the hardware processing unit, and specific content awareness of the request message and data processing do not need to be performed at the driver layer. The hardware processing unit may parse the request message, and process data according to a parsing result.

In this embodiment, the request message includes at least the acceleration type identifier and the to-be-acceleratedly-processed service data. Each acceleration type identifier corresponds to one type of accelerated processing. The hardware processing unit may learn of a to-be-performed acceleration service according to the acceleration type identifier.

Step 102: Perform at least one type of accelerated processing in a one-to-one correspondence with the at least one acceleration type identifier on the service data.

After parsing out the acceleration type identifier and the service data from the request message, the hardware processing unit may perform accelerated processing corresponding to the acceleration type identifier on the service data.

In this embodiment of the present disclosure, a message structure is agreed between a host and a hardware processing unit, so that the host may directly send a request message to the hardware processing unit, and the hardware processing unit parses the request message and processes data. In the method, interaction between a host service layer and the hardware processing unit does not need coordination of a specialized driver, so that dependence on a specific underlying driver for a service layer may be shielded. In this method, the hardware processing unit may run on different service platforms, and have strengthened logic interoperability, thereby improving mobility and flexibility in a service processing process.

Based on the foregoing embodiment, in this embodiment, if the request message sent by the host to the hardware processing unit includes multiple acceleration type identifiers, the hardware processing unit needs to perform multiple types of accelerated processing. The request message may further include an acceleration sequence identifier in a one-to-one correspondence with each acceleration type identifier, and the acceleration sequence identifiers are used to indicate an acceleration processing order.

After parsing out the service data, the acceleration type identifiers, and the acceleration sequence identifiers, the hardware processing unit may perform accelerated processing corresponding to each of the multiple acceleration type identifiers on the service data according to the order indicated by the multiple acceleration sequence identifiers.

In this embodiment, an acceleration sequence identifier is added into a request message, so that a hardware processing unit may perform accelerated processing corresponding to each of multiple acceleration type identifiers on service data according to an order indicated by the multiple acceleration sequence identifiers, thereby implementing pipeline processing on the service data, and increasing processing efficiency.

Based on both the foregoing embodiments, in this embodiment, a field area and a data area may be set in the message transmitted between the host and the hardware processing unit. The field area includes a service header field and a control header field. The data area is used to carry the service data and processed service data.

Figure 2:
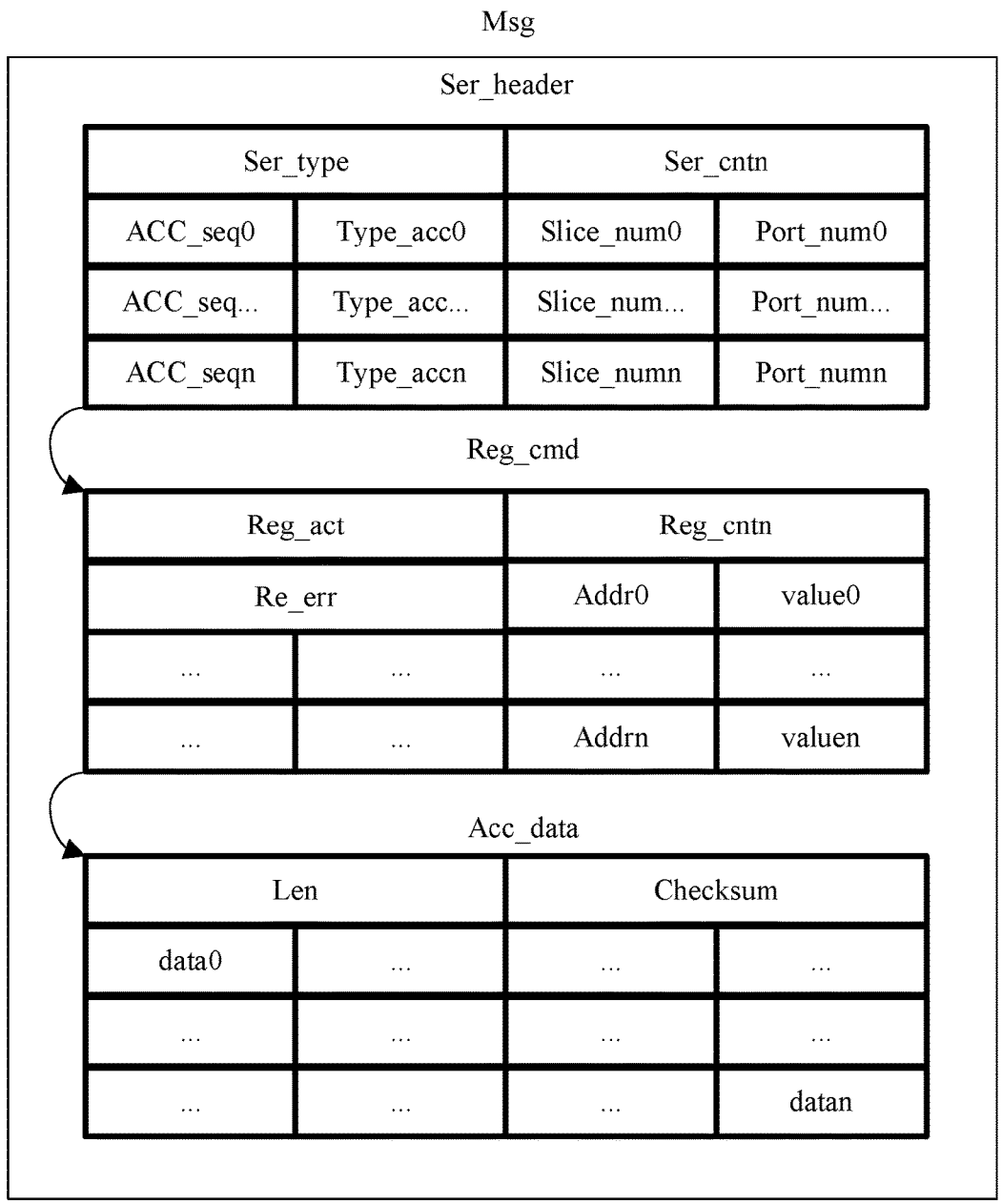
FIG. 2 is a schematic structural diagram of a message according to an embodiment of the present disclosure.

In a specific implementation manner, as shown in FIG. 2, a message structure of the message may include a service header, a control header, and service data. Certainly, in another embodiment, the message may further include other information.

The service header (Ser_header) includes a Ser_type field, a Ser_cntn field, an ACC_seqn field, a Type_accn field, a slice_numn field, and a port_numn field. The Ser_type field indicates a message direction. For example, the message is delivered to the hardware processing unit by the host, or is fed back to the host by the hardware processing unit. Different field values of the field may be used to distinguish between the request message delivered by the host and a feedback message sent by the hardware processing unit. The ACC_seqn field indicates a specific acceleration sequence. The Type_accn field indicates a specific acceleration type, and Ser_cntn indicates a quantity of pairs including slice_numn and port_numn. The slice_numn field indicates an identifier of an acceleration processing group. The port_numn field indicates an identifier of an acceleration processing module.

The control header (Reg_cmd) is used to construct a virtual register read and write channel. The control header includes a Reg_act field, a Reg_cntn field, a Re_err field, an Addrn field, and a valuen field. The Reg_act field indicates a control message type, which is configuration information or other read and write information. The Re_err field indicates information marking a right or wrong control state. The Reg_cntn field indicates a quantity of pairs including the Addrn field and the valuen field. The Addrn field indicates information about an address on which acceleration logic may be operated. The valuen field indicates a value corresponding to the Addrn field.

Acceleration data (Acc_data) is used to carry service data that needs to be processed or a reporting result for processed data. Len indicates a data length, and Checksum indicates a check.

The host may send the request message to the hardware processing unit by using the interconnect port.

Based on all the foregoing embodiments, in this embodiment, the hardware processing unit may specifically include a receiving module, an inter-group routing module, and at least one acceleration processing group.

Specifically, there may be one or more inter-group routing modules, and each inter-group routing module may be programmed by using an FPGA chip, and is used to select different intra-group routing modules. The intra-group routing module may also be programmed by using one FPGA resource. An intra-group routing module in each acceleration processing group connects to multiple acceleration processing modules. Different acceleration processing modules may implement different types of accelerated processing. The acceleration processing modules may be totally or partially the same.

The inter-group routing module includes an inter-group routing table, and the inter-group routing table includes a correspondence between an acceleration type identifier and an acceleration processing group.

In this embodiment, when the hardware processing unit is receiving the message sent by the host, the receiving module of the hardware processing unit may specifically receive the message sent by the host.

Figure 3:
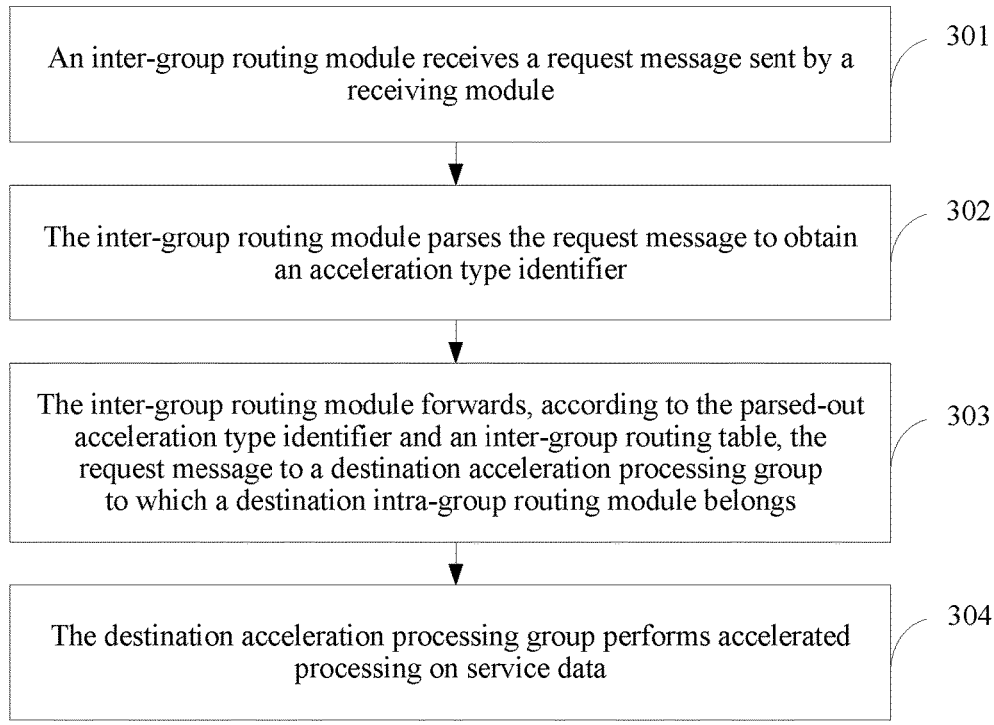
FIG. 3 is a step flowchart of a method for performing accelerated processing on service data according to an embodiment of the present disclosure.

As shown in FIG. 3, a process in which the hardware processing unit performs at least one type of accelerated processing in a one-to-one correspondence with the at least one acceleration type identifier on the service data may include the following steps.

Step 301: The inter-group routing module receives the request message sent by the receiving module.

Figure 4:
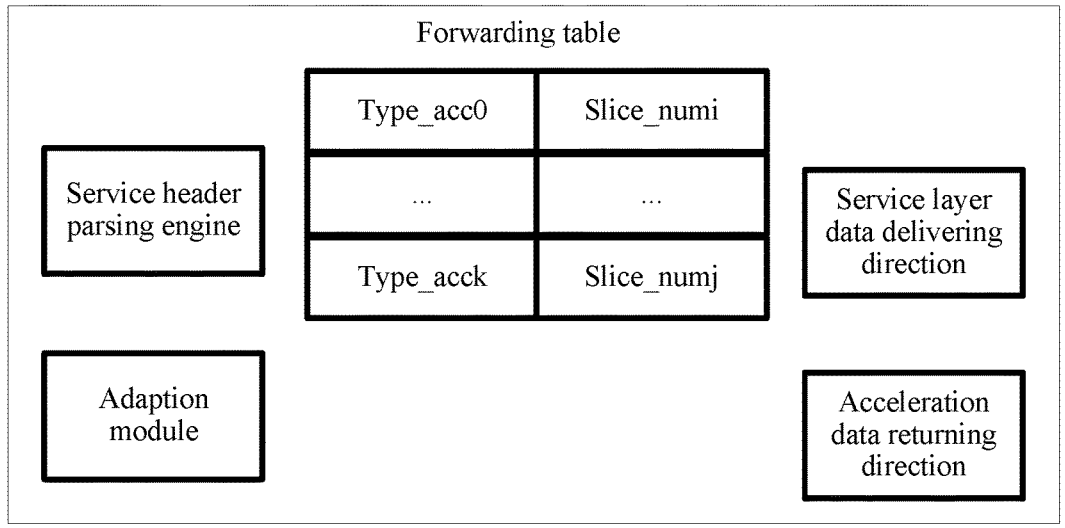
FIG. 4 a schematic diagram of an internal structure of an inter-group routing module according to an embodiment of the present disclosure.

In this embodiment, the inter-group routing module may be programmed by using an FPGA chip. As shown in FIG. 4, a structure of the inter-group routing module may include four main parts: an adaption module, a service header parsing engine, a slice forwarding table, and a scheduling module.

The adaption module (Adaption) mainly completes protocol stack port adaption work, and a user inter-group router adapts to a transmission port protocol.

The service header parsing engine parses a message structure constructed at the host service layer, and the service header parsing engine performs different procedure operations according to different acceleration type identifiers in the service header.

The slice forwarding table (Slice Table) is also inter-group routing configuration information. The slice forwarding table marks a forwarding relationship between Type_acc and an intra-group router (Slice_num) in the message structure of an acceleration service. The forwarding table may be sent in advance from the service layer to the inter-group router by using a configuration message, and the service parsing engine obtains the forwarding table from the configuration message.

The scheduling module includes:

a service layer data delivering direction (Switch_out): forwarding the message to a corresponding intra-group routing module in a service aggregation resource pool by using slice information in the forwarding table; and an acceleration data returning direction (Switch_in): obtaining a reported acceleration data result from an intra-group routing module, and transferring the result to the internal adaption module.

After the inter-group routing module receives the message, perform step 302.

Step 302: The inter-group routing module parses the request message to obtain the acceleration type identifier.

The inter-group routing module parses the request message by using the service header parsing engine, to obtain the acceleration type identifier.

Step 303: The inter-group routing module forwards the request message to a destination acceleration processing group according to the parsed-out acceleration type identifier and the inter-group routing table.

The inter-group routing module searches for an intra-group routing module corresponding to the acceleration type identifier, that is, a destination intra-group routing module, by using the inter-group routing table, that is, the slice forwarding table, and may specifically obtain an identifier number Slice_num of the intra-group routing module. The inter-group routing module sends, by using Switch_out, the message to a destination acceleration processing group to which the destination intra-group routing module belongs. When multiple acceleration type identifiers are parsed out by the inter-group routing module, processing may be sequentially performed according to acceleration sequence identifiers.

Step 304: The destination acceleration processing group performs accelerated processing on the service data.

Based on all the foregoing embodiments, in this embodiment, the acceleration processing group includes a parsing module, an intra-group routing module, and at least one acceleration processing module. The at least one acceleration processing module is configured to perform different types of accelerated processing on a same service. The intra-group routing module includes an intra-group routing table, and the intra-group routing table includes a correspondence between an acceleration type identifier and an acceleration processing module.

Figure 5:
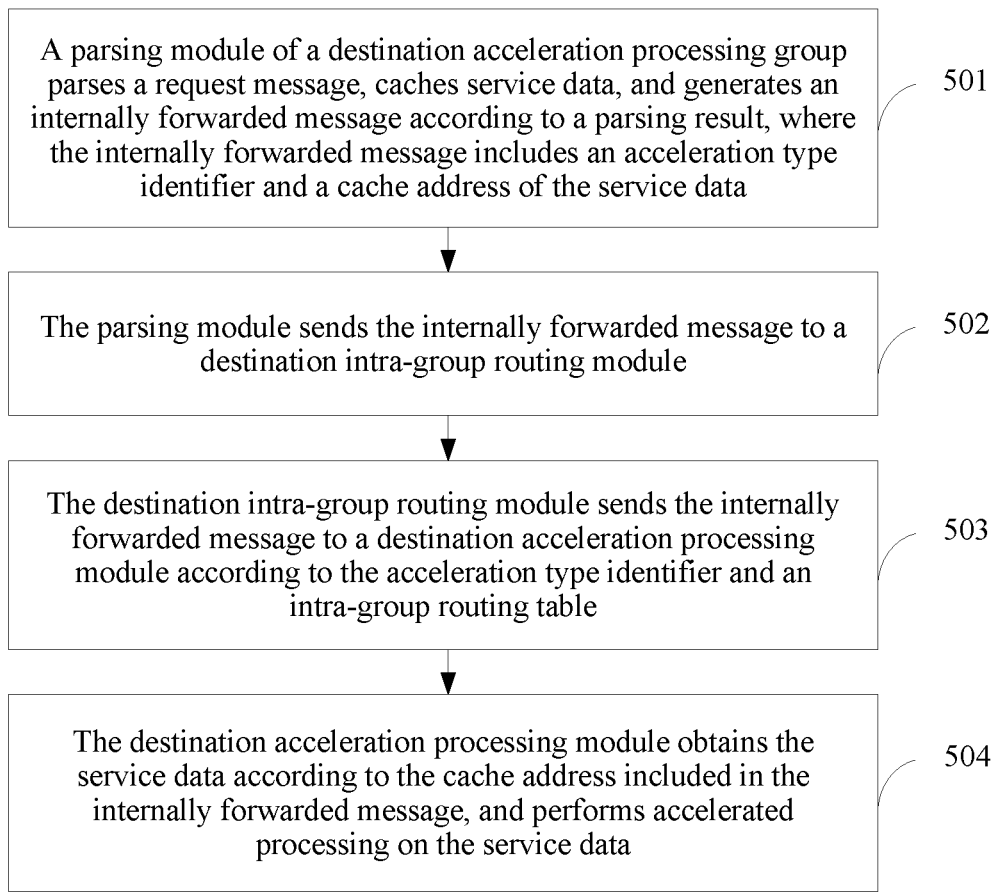
FIG. 5 is a step flowchart of a method in which a destination acceleration processing group instructs each acceleration processing module to perform accelerated processing on service data according to an embodiment of the present disclosure.

As shown in FIG. 5, a process in which the destination acceleration processing group performs accelerated processing on the service data may include the following steps.

Step 501: A parsing module of the destination acceleration processing group parses the request message, caches the service data, and generates an internally forwarded message according to a parsing result, where the internally forwarded message includes the acceleration type identifier and a cache address of the service data.

Figure 6:
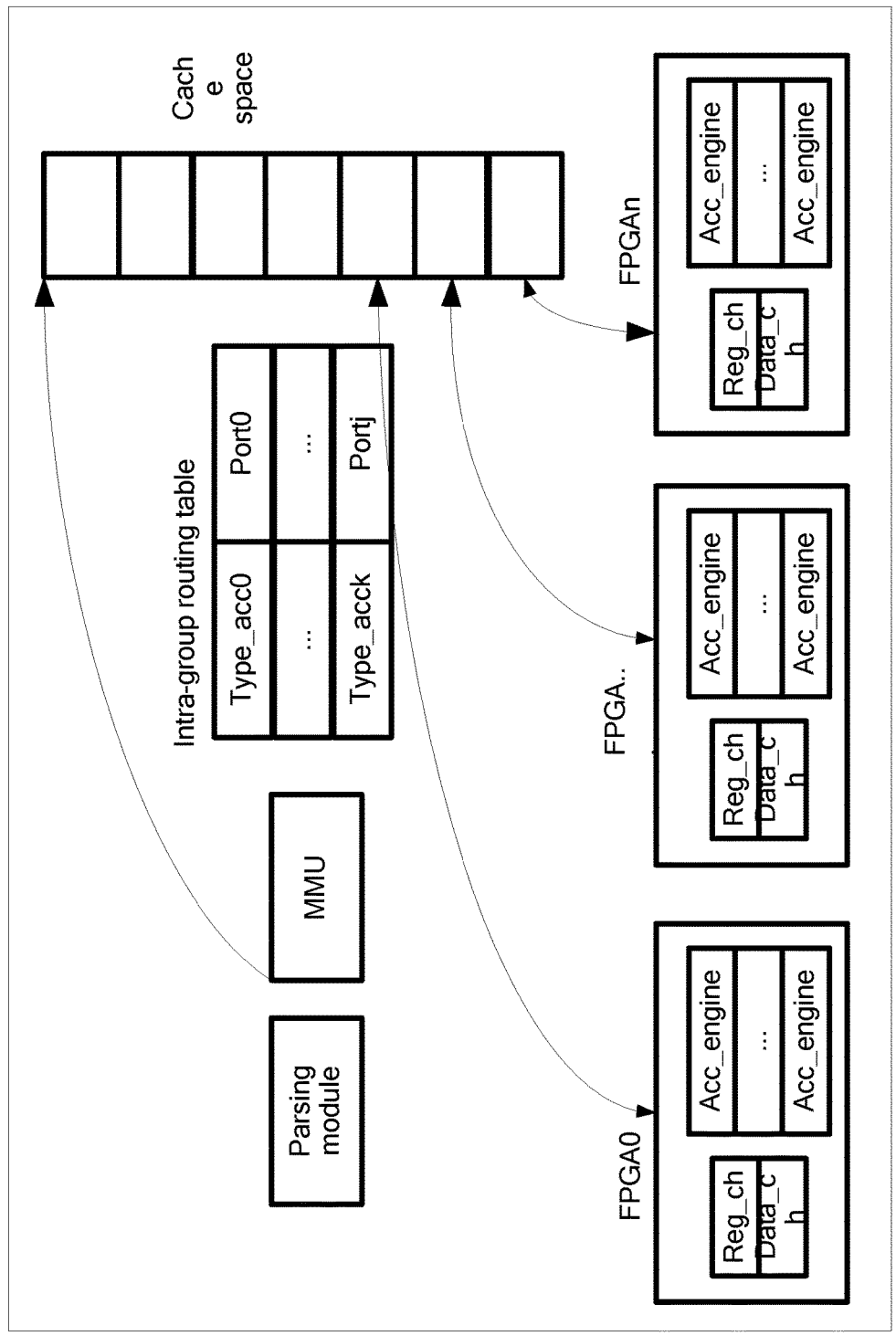
FIG. 6 is a schematic diagram of an internal structure of an acceleration processing group according to an embodiment of the present disclosure.

As shown in FIG. 6, the acceleration processing group includes three main parts: a parsing module, an intra-group routing module, and an acceleration processing module.

The parsing module is configured to complete parsing of the request message to obtain three separate parts: the service header, the control header, and the service data. Centralized cache space is set in the acceleration processing group. After requesting a cache address for cache space, the parsing module caches parsed service data into corresponding cache space according to the cache address, generates an internally forwarded message according to the requested cache address, service information in the service header, and control information in the control header, and forwards the internally forwarded message to the intra-group routing module. The acceleration processing group has centralized cache space.

The intra-group routing module is configured to store a correspondence between each Type_acc in the group and an acceleration processing module (Port), that is, the intra-group routing table (Acc Table). The information may be sent in advance from the service layer to the intra-group routing module by using the configuration message.

The acceleration processing module (FPGAn), that is, acceleration logic, is a unit to implement a specific service function or service logic. An ingress of the acceleration processing module includes a data channel and a virtual register channel. The register channel is used to configure and read an internal register, and the data channel is used to send acceleration data into the acceleration logic to perform accelerated processing.

After the destination acceleration processing group receives the message sent by the inter-group routing module, a data parsing engine caches the parsed service data according to the requested address, and generates the internally forwarded message according to requested address information, the service information in the service header, and the control information in the control header.

Step 502: The parsing module sends the internally forwarded message to an intra-group routing module of the destination acceleration processing group.

Step 503: The destination intra-group routing module sends the internally forwarded message to a destination acceleration processing module according to the acceleration type identifier and an intra-group routing table.

The destination intra-group routing module parses the received internally forwarded message, learns of the acceleration type identifier in the internally forwarded message, searches for an acceleration processing module (Port) corresponding to the acceleration type identifier, that is, the destination acceleration processing module, according to the intra-group routing table, and then sends the internally forwarded message to the destination acceleration processing module.

Step 504: The destination acceleration processing module obtains the service data according to the cache address included in the internally forwarded message, and performs accelerated processing on the service data.

The destination acceleration processing module reads the service data from the cache space according to the cache address included in the internally forwarded message, processes the service data, and then caches processed data to the cache space according to the cache address. In the cache space, the processed data sent by the destination acceleration processing module may be further identified to indicate that data stored in the cache address is processed data.

In another embodiment, when the internally forwarded message includes the acceleration sequence identifiers, the destination acceleration processing module may cache acceleratedly processed service data, and notify the intra-group routing module. The intra-group routing module sends the internally forwarded message to a next destination acceleration processing module according to the acceleration sequence identifiers. The next destination acceleration processing module performs accelerated processing on the data cached by the destination acceleration processing module, and repeats actions of the destination acceleration processing module until the end of the acceleration order indicated by the acceleration sequence identifiers.

The intra-group routing module may send the internally forwarded message to destination acceleration processing modules corresponding to the acceleration type identifiers of the service in this group at the same time or according to the acceleration sequence identifiers included in service control information. These destination acceleration processing modules sequentially obtain, according to the cache address in the internally forwarded message, service data in the cache space corresponding to the cache address to perform data processing, and re-store processed data into the cache space corresponding to the cache address. A destination acceleration processing module may read identifier information of data in the cache space corresponding to the cache address, to determine whether a previous destination acceleration processing module in the acceleration sequence identifiers has completed processing the data, and after data processing is complete, read again data in the cache space corresponding to the cache address to perform processing until all the destination acceleration processing modules in the acceleration sequence identifiers complete processing the data.

Figure 7:
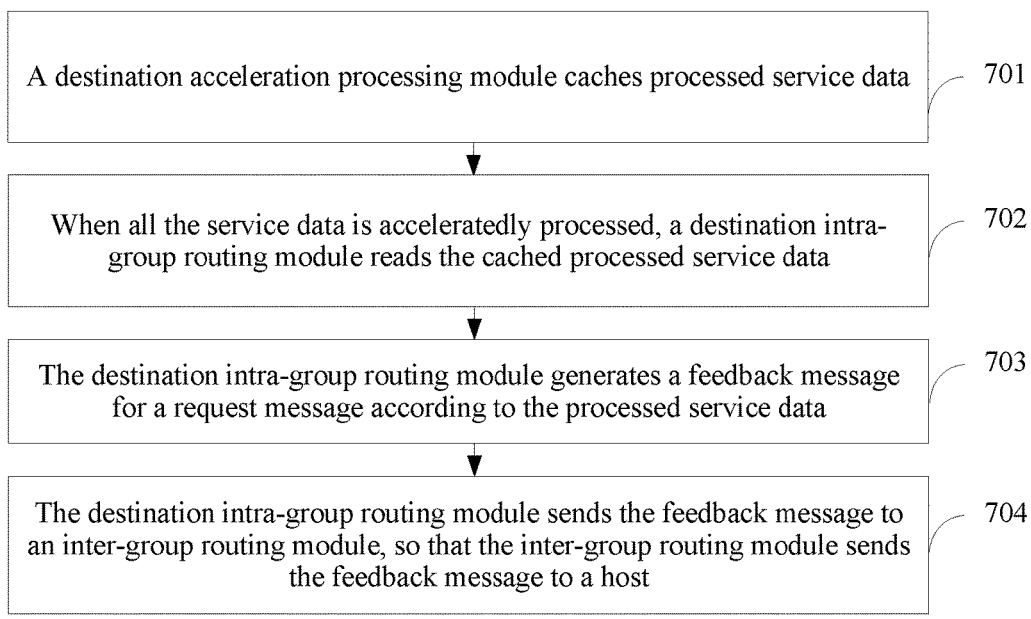
FIG. 7 is a step flowchart of a method for sending a feedback message by an intra-group routing module according to an embodiment of the present disclosure.

Based on all the foregoing embodiments, in this embodiment, after the destination acceleration processing module completes processing the service data, as shown in FIG. 7, the following steps may be further included.

Step 701: The destination acceleration processing module caches processed service data.

Step 702: When all the service data is acceleratedly processed, the destination intra-group routing module reads the cached processed service data.

When learning, according to the identifier information of the data in the cache space, that all the service data is processed, the destination intra-group routing module reads the processed data in the cache space.

Step 703: The destination intra-group routing module generates a feedback message for a request message according to the processed service data.

The destination intra-group routing module generates the feedback message according to the same fixed message structure as the request message and according to the processed data.

Step 704: The destination intra-group routing module sends the feedback message to the inter-group routing module, so that the inter-group routing module sends the feedback message to the host.

The destination intra-group routing module returns the feedback message to the host service layer according to a reverse path of a transmission path of the message.

Based on all the foregoing embodiments, the inter-group routing table and the intra-group routing table may be obtained in the following manners.

A message is sent from the host service layer to the inter-group routing module and the intra-group routing module. The message carries a correspondence among an acceleration type identifier, an intra-group routing module, and an acceleration processing module, such as service number+slice number+port number.

After receiving the message, the inter-group routing module and the intra-group routing module establish an inter-group routing table and intra-group routing table respectively.

In addition, at the host service layer, an aging switch and an aging time are configured for the inter-group routing table and for the intra-group routing table. The aging time and the aging switch are configured at the service layer by using the register channel, and information about the register channel is carried in Reg_cmd of the message.

When the aging switch of the inter-group routing table is enabled and the aging time elapses, the inter-group routing module reports to the host, to request the host to configure a new inter-group routing table.

Likewise, when the aging switch of the intra-group routing table is enabled and the aging time elapses, the intra-group routing module reports to the host, to request the host to configure a new intra-group routing table.

The inter-group routing module and the intra-group routing module maintain respective aging switches and aging times. In some scenarios, if an entry of the inter-group routing table or the intra-group routing table ages, and new service data is delivered, the inter-group routing module or the intra-group routing module records the abnormal scenario, and returns the abnormal scenario to the service layer, to request the service layer to deliver a configuration message again.

Based on all the foregoing embodiments, in this embodiment, the host and the hardware processing unit may be interconnected by using a PCIe port or another port protocol. The FPGA as the inter-group routing module and the acceleration processing group are interconnected by using an interconnect port (may be a PCIe or another interconnect port). The intra-group routing module and the acceleration processing module may be interconnected by using common port resources. A specific structure of the interconnection is shown in FIG. 8 and FIG. 9.

Figure 8:
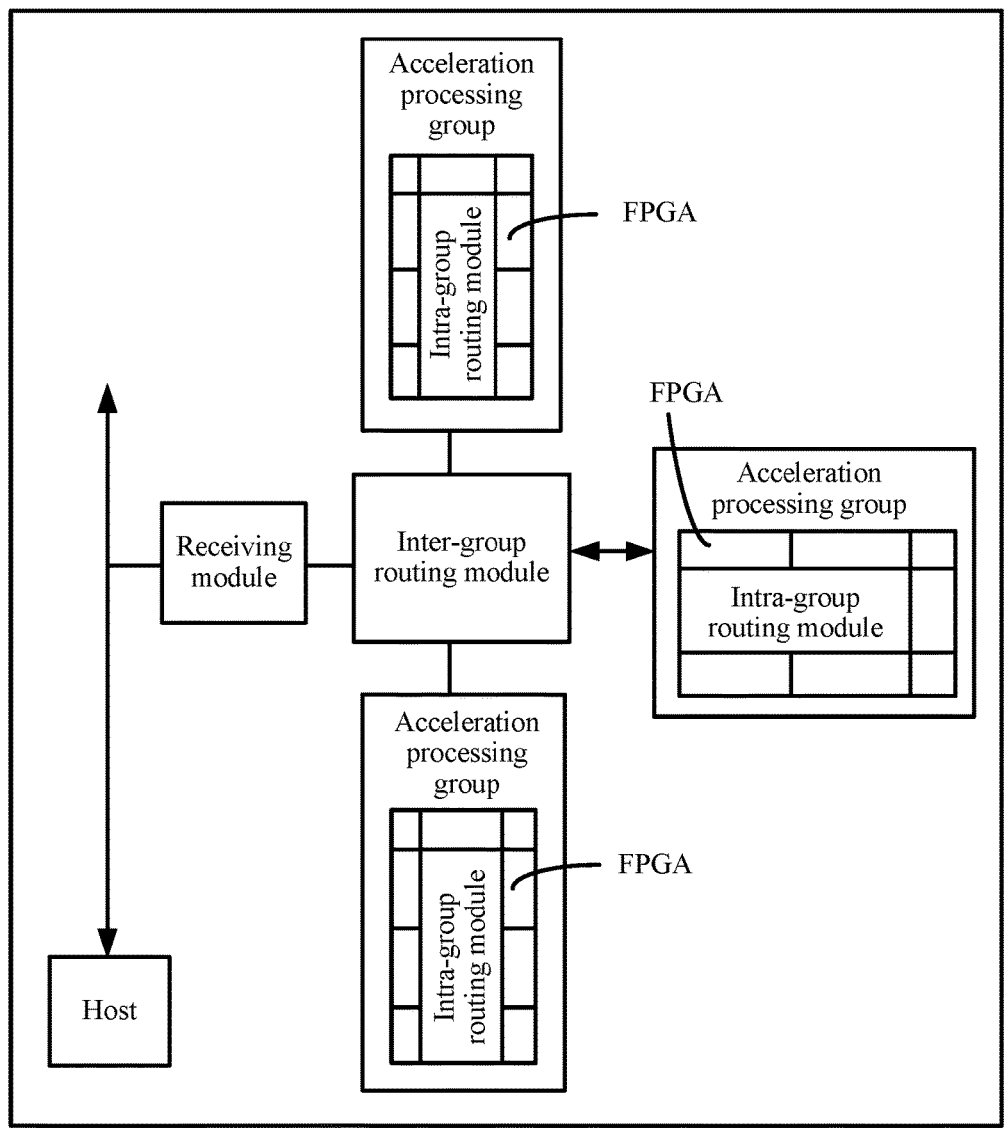
FIG. 8 is a schematic structural diagram of a data processing system according to an embodiment of the present disclosure.

In an application scenario shown in FIG. 8, there is a baseboard inside a server subrack. Multiple groups of chips such as CPU resources, a memory, and a south bridge are installed on the baseboard. A host and one FPGA resource serving as an inter-group routing module are interconnected (by using a PCIe port or another port protocol). The FPGA as the inter-group routing module and each FPGA as an intra-group routing module are interconnected by using an interconnect port (may be a PCIe port or another interconnect port). The intra-group routing module and multiple FPGA acceleration resources, that is, multiple acceleration processing modules, are interconnected by using common port resources. Each intra-group routing module and acceleration processing modules of the intra-group routing module may constitute an acceleration processing group.

It can be learned that, the foregoing structure is a structure of cascading the inter-group routing module with the intra-group routing module. Each intra-group routing module may be extended and integrate a new acceleration processing module. Each inter-group routing module may also be extended and integrate a new acceleration processing group including an intra-group routing module and an acceleration processing module. Continuous integration and extension of the whole system are strengthened.

Figure 9:
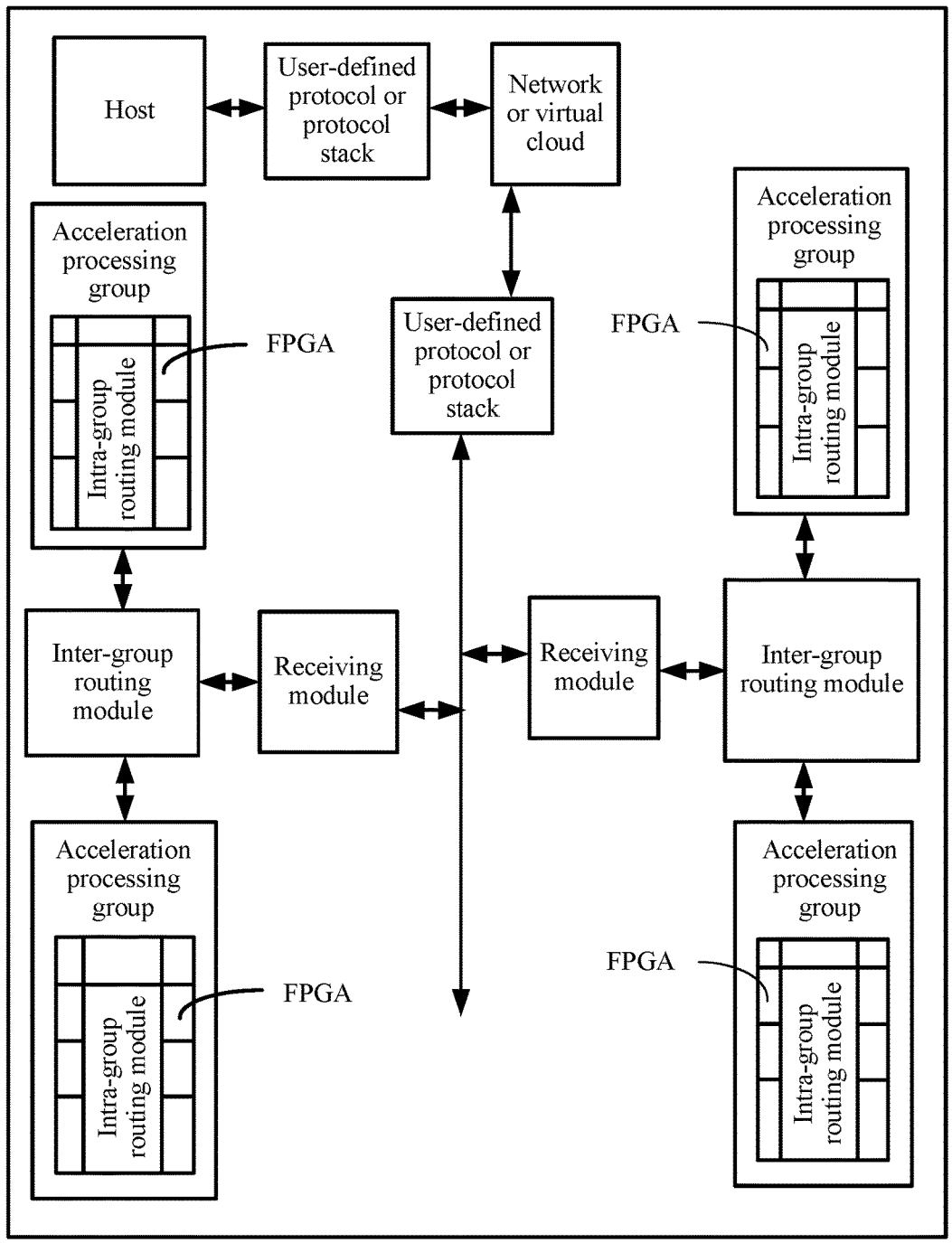
FIG. 9 is a schematic structural diagram of another data processing system according to an embodiment of the present disclosure.

In a structure shown in FIG. 9, a difference between this structure and the structure shown in FIG. 8 lies in that a host in this example and an inter-group routing module are interconnected by using a network, or a network element such as a virtual cloud, or an intermediate device. It may be learned from this implementation solution that, different from the local acceleration solution shown in FIG. 8, in this example, a peer device of a transmit end of the host exists at a front end of the inter-group routing module. The device may be a peer protocol stack, or another user-defined interaction protocol. The peer device interconnects a received message to the inter-group routing module by using an internal bus structure. After the message is sent to the inter-group routing module, a subsequent processing process is totally the same. In this embodiment, the host is totally separated from an entire structure of the inter-group routing module and the acceleration processing group, so that in a network, multiple server groups may share the acceleration processing group. Therefore, the inter-group routing module may also be extended in hierarchy, and an extension type may be defined in a service header of a message.

In the foregoing embodiments, not only dependence on a specific underlying driver for a host service layer may be shielded, but also mobility and flexibility in a service processing process are improved.

In addition, in a structure of cascading the inter-group routing module with the intra-group routing module, not only an acceleration processing module of the intra-group routing module may be extended, but also a new acceleration processing group may be extended in the inter-group routing module, so that continuous integration and extension of the whole system are strengthened.

Further, for a service with limited resources, at the host service layer, an acceleration processing group may be organized according to a service requirement and an acceleration urgency degree, and acceleration processing groups of different functions form. Different resources are scheduled and allocated according to different services, and refined service acceleration can be implemented.

Figure 10:
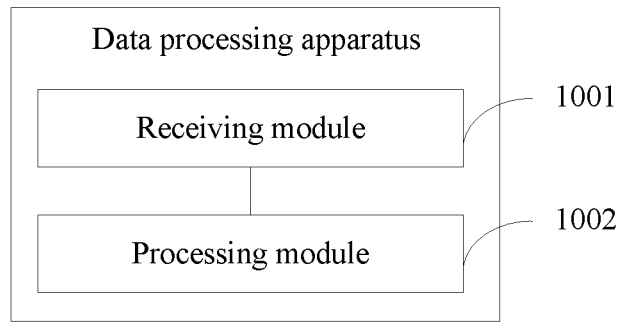
FIG. 10 is a structural block diagram of an embodiment of a data processing apparatus according to the present disclosure.

Based on all the foregoing embodiments, an embodiment of the present disclosure discloses a data processing apparatus. Referring to FIG. 10, FIG. 10 is a structural block diagram of the data processing apparatus in this embodiment. The data processing apparatus in this embodiment is applied to a scenario in which service data sent by a host is accelerated, and the apparatus includes:

a receiving module 1001, configured to receive a request message that is sent from a host service layer and transparently transmitted through a host driver layer, where the request message includes at least one acceleration type identifier and to-be-acceleratedly-processed service data, and each acceleration type identifier corresponds to one type of accelerated processing; and a processing module 1002, configured to perform at least one type of accelerated processing in a one-to-one correspondence with the at least one acceleration type identifier on the service data received by the receiving module 1001.

In this embodiment of the present disclosure, a message structure is agreed between a host and the data processing apparatus, so that the host may directly send a message to the data processing apparatus, and the data processing apparatus uses the foregoing units to parse the message and process data. Interaction between the data processing apparatus and the host does not need coordination of a specialized driver, so that dependence on a specific underlying driver for a host service layer may be shielded. The data processing apparatus may run on different service platforms, and have strengthened logic interoperability, thereby improving mobility and flexibility in a service processing process.

In another embodiment, the message may include multiple acceleration type identifiers. The message further includes an acceleration sequence identifier in a one-to-one correspondence with each acceleration type identifier, and the acceleration sequence identifiers are used to indicate an acceleration processing order.

The processing module 1002 is further configured to perform accelerated processing corresponding to each of the multiple acceleration type identifiers on the service data according to the order indicated by the multiple acceleration sequence identifiers.

Figure 11:
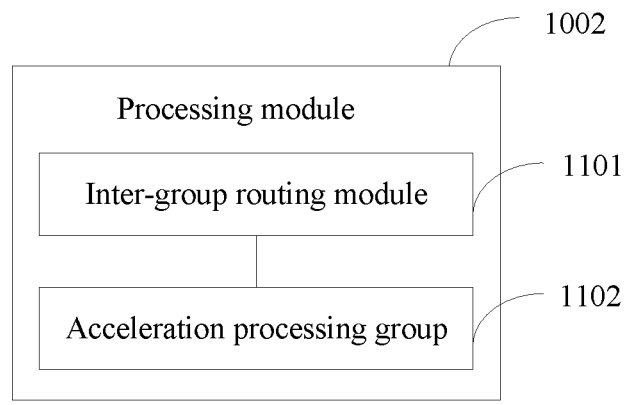
FIG. 11 is a structural block diagram of a processing module according to an embodiment of the present disclosure.

In another embodiment, as shown in FIG. 11, the processing module 1002 may include:

an inter-group routing module 1101 and at least one acceleration processing group 1102.

The inter-group routing module 1101 includes an inter-group routing table, and the inter-group routing table includes a correspondence between an acceleration type identifier and an acceleration processing group 1102. The inter-group routing module 1101 is configured to receive the request message sent by the receiving module 1001, parse the request message to obtain the acceleration type identifier, and forward the request message to a destination acceleration processing group 1102 according to the parsed-out acceleration type identifier and the inter-group routing table.

The acceleration processing group 1102 is configured to perform accelerated processing on the service data.

Figure 12:
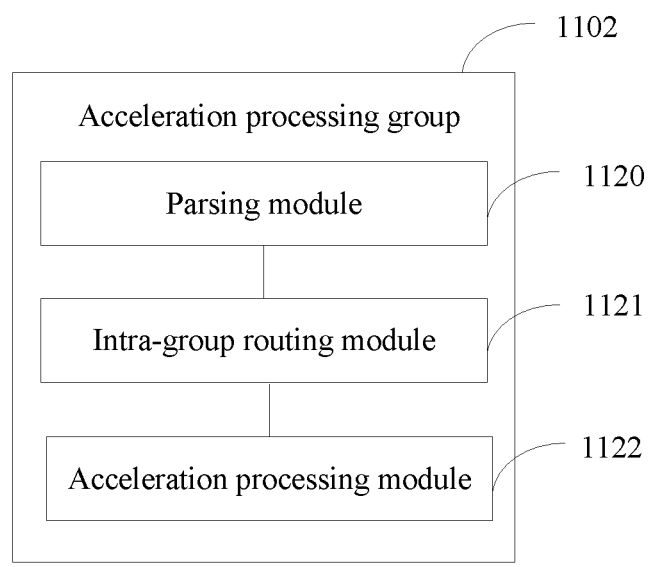
FIG. 12 is a structural block diagram of an acceleration processing group according to an embodiment of the present disclosure.

In another embodiment, as shown in FIG. 12, each acceleration processing group 1102 includes a parsing module 1120, an intra-group routing module 1121, and at least one acceleration processing module 1122. The at least one acceleration processing module 1122 is configured to perform different types of accelerated processing on a same service.

The parsing module 1120 is configured to: parse the request message sent by the inter-group routing module 1101, cache the service data, generate an internally forwarded message according to a parsing result, where the internally forwarded message includes the acceleration type identifier and a cache address of the service data; and send the internally forwarded message to the intra-group routing module 1121.

The intra-group routing module 1121 includes an intra-group routing table, and the intra-group routing table includes a correspondence between an acceleration type identifier and an acceleration processing module. The intra-group routing module 1121 is configured to send the internally forwarded message received from the parsing module to a destination acceleration processing module 1122 according to the acceleration type identifier and the intra-group routing table.

The acceleration processing module 1122 is configured to obtain the service data according to the cache address included in the internally forwarded message received from the intra-group routing module 1121, and perform accelerated processing on the service data.

In another embodiment, when the internally forwarded message includes the acceleration sequence identifiers, the acceleration processing module 1122 is further configured to cache acceleratedly processed service data, and notify the intra-group routing module 1121.

After receiving a notification sent by the acceleration processing module, the intra-group routing module 1121 is further configured to send the internally forwarded message to a next destination acceleration processing module according to the acceleration sequence identifiers, to enable the next destination acceleration processing module to perform accelerated processing on the data cached by the destination acceleration processing module until the end of the acceleration order indicated by the acceleration sequence identifiers.

In another embodiment, the acceleration processing module 1122 is further configured to cache processed service data; and when all the service data is acceleratedly processed, the intra-group routing module 1121 is further configured to read the processed service data cached by the acceleration processing module 1122, generate a feedback message corresponding to the request message according to the processed service data, and send the feedback message to the inter-group routing module 1101, to enable the inter-group routing module 1101 to send the feedback message to the host.

In another embodiment, an aging switch and an aging time are configured in the inter-group routing table; and when the aging switch of the inter-group routing table is enabled and the aging time elapses, the inter-group routing module 1101 is further configured to report to the host, to request the host to configure a new inter-group routing table.

An aging switch and an aging time are configured in the intra-group routing table; and when the aging switch of the intra-group routing table is enabled and the aging time elapses, the intra-group routing module 1121 is further configured to report to the host, to request the host to configure a new intra-group routing table.

In another embodiment, the receiving module 1001 may be specifically configured to receive, by using a PCIe port, a message sent by the host, or receive, by using a network or a virtual cloud or an intermediate device, a message sent by the host.

In another embodiment, the feedback message and the request message have a same message structure. The message structure includes a message type field for distinguishing between the feedback message and the request message.

In another embodiment, a field area and a data area are set in the request message. The field area includes a service header field and a control header field, the service header field includes the acceleration type identifier, and the data area is used to carry the service data.

Figure 13:
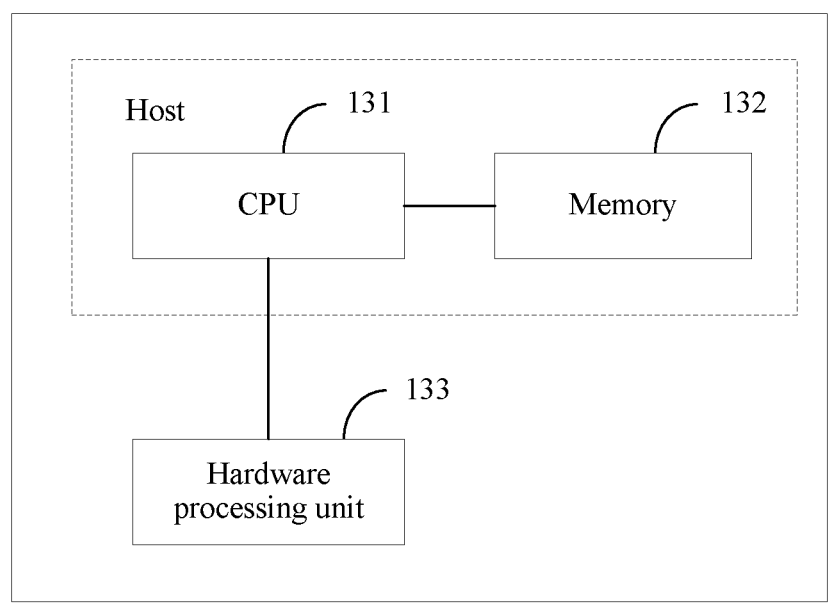
FIG. 13 is a schematic structural diagram of another data processing system according to an embodiment of the present disclosure.

Based on all the foregoing embodiments, an embodiment of the present disclosure discloses a data processing apparatus. As shown in FIG. 13, the apparatus includes a CPU 131, a memory 132, and a hardware processing unit 133. The CPU connects to the memory and the hardware processing unit, and the hardware processing unit may be an FPGA, an ASIC, or the like.

The CPU and the memory as a whole may be considered as a host. The CPU reads code from the memory to execute a program. In terms of software, the executed program includes a host driver layer and a host service layer. These software and hardware architectures are technologies understood by persons skilled in the art, and details are not described herein.

The hardware processing unit is configured to receive a request message that is sent from the host service layer and transparently transmitted through the host driver layer. The request message includes at least one acceleration type identifier and to-be-acceleratedly-processed service data, and each acceleration type identifier corresponds to one type of accelerated processing.

The hardware processing unit is further configured to perform at least one type of accelerated processing in a one-to-one correspondence with the at least one acceleration type identifier on the service data.

In the apparatus, a message structure is agreed between a CPU and a hardware processing unit, so that the CPU may directly send a request message to the hardware processing unit, and the hardware processing unit parses the request message and processes data. In the apparatus, interaction between the CPU and the hardware processing unit does not need coordination of a specialized driver, so that dependence on a specific underlying driver for the CPU may be shielded.

An apparatus embodiment is basically similar to a method embodiment, and therefore is described briefly. For related parts, refer to partial descriptions in the method embodiment.

The embodiments in this specification are all described in a progressive manner, and each embodiment focuses on a difference from other embodiments. For same or similar parts in the embodiments, refer to these embodiments.

Persons of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the embodiments of the present disclosure.

In the end, it should be noted that in this specification, relational terms such as first and second are only used to distinguish one entity or operation from another, and do not necessarily require or imply that any actual relationship or sequence exists between these entities or operations. Moreover, the terms "include", "include", or their any other variant is intended to cover a non-exclusive inclusion, so that a process, a method, an article, or a terminal device that includes a list of elements not only includes those elements but also includes other elements that are not expressly listed, or further includes elements inherent to such a process, method, article, or terminal device. An element preceded by "includes a . . . " does not, without more constraints, preclude the presence of additional identical elements in the process, method, article, or terminal device that includes the element.

In the foregoing, a data processing method and a data processing apparatus of the present disclosure are described in detail. Specific examples are applied in this specification to illustrate the principle and implementation manner of the present disclosure. The descriptions of the foregoing embodiments are merely used to facilitate understanding of the method and core ideas of the present disclosure; in addition, with respect to specific implementation and applicability, modifications and variations may be made by persons of ordinary skill in the art according to the ideas of the present disclosure. Therefore, the content of this specification shall not be construed as a limitation on the present disclosure.

What is claimed is:

1. A data processing method applied to a scenario in which a hardware processor accelerates service data sent by a host, wherein the method comprises:
    receiving, by the hardware processor, a request message originated at a host service layer of the host and transparently transmitted to the hardware processor through a host driver of the host without the host driver parsing or modifying content of to-be-acceleratedly-processed service data of the request message, wherein the request message comprises at least one acceleration type identifier in addition to the to-be-acceleratedly-processed service data, and wherein each acceleration type identifier corresponds to one type of accelerated processing; and
    performing, by the hardware processor, at least one type of accelerated processing in a one-to-one correspondence with the at least one acceleration type identifier on the service data.

2. The method of claim 1, wherein the request message comprises multiple acceleration type identifiers, wherein the request message further comprises acceleration sequence identifiers in a one-to-one correspondence with each acceleration type identifier, wherein the acceleration sequence identifiers are used to indicate an acceleration processing order, and wherein performing the at least one type of accelerated processing in a one-to-one correspondence with the at least one acceleration type identifier on the service data comprises performing multiple types of accelerated processing in a one-to-one correspondence with the multiple acceleration type identifiers on the service data according to the order indicated by the acceleration sequence identifiers.

3. The method of claim 1, wherein the hardware processor comprises a receiver, an inter-group router, and at least one acceleration processing group, wherein the inter-group router comprises an inter-group routing table, wherein the inter-group routing table comprises a correspondence between an acceleration type identifier and an acceleration processing group, wherein receiving the request message comprises receiving, by the receiver, the request message, and wherein performing at least one type of accelerated processing in a one-to-one correspondence with the at least one acceleration type identifier on the service data comprises:
    receiving, by the inter-group router, the request message;
    parsing, by the inter-group router, the request message to obtain the acceleration type identifier;
    forwarding, by the inter-group router, the request message to a destination acceleration processing group according to the acceleration type identifier and the inter-group routing table; and
    performing, by the destination acceleration processing group, accelerated processing on the service data.

4. The method of claim 3, wherein the acceleration processing group comprises a parser, an intra-group router, and at least one acceleration processor, wherein the at least one acceleration processor is configured to perform different types of accelerated processing on a same service, wherein the intra-group router comprises an intra-group routing table, wherein the intra-group routing table comprises a correspondence between an acceleration type identifier and an acceleration processor, and wherein performing, by the destination acceleration processing group, accelerated processing on the service data comprises:
    parsing, by a parser of the destination acceleration processing group, the request message;
    caching the service data;
    generating an internally forwarded message according to a parsing result, wherein the internally forwarded message comprises the acceleration type identifier and a cache address of the service data;
    sending, by the parser, the internally forwarded message to an intra-group router of the destination acceleration processing group;
    sending, by the intra-group router, the internally forwarded message to a destination acceleration processor according to the acceleration type identifier and the intra-group routing table; and
    obtaining, by the destination acceleration processor, the service data according to the cache address comprised in the internally forwarded message; and
    performing accelerated processing on the service data.

5. The method of claim 4, wherein when the internally forwarded message comprises acceleration sequence identifiers, performing, by the destination acceleration processing group, accelerated processing on the service data further comprises:
    caching, by the destination acceleration processor, acceleratedly processed service data to generate cached data;
    notifying the intra-group router; and
    sending, by the intra-group router, the internally forwarded message to a next destination acceleration processor according to the acceleration sequence identifiers to enable the next destination acceleration processor to perform accelerated processing on the cached data cached by the destination acceleration processor until the end of an acceleration order indicated by the acceleration sequence identifiers.

6. The method of claim 4, wherein the method further comprises:
    caching, by the destination acceleration processor, processed service data;
    when all the service data is acceleratedly processed, reading, by the destination intra-group router, the cached processed service data;
    generating, by the destination intra-group router, a feedback message corresponding to the request message according to the processed service data; and
    sending, by the destination intra-group router, the feedback message to the inter-group router, so that the inter-group router sends the feedback message to the host.

7. The method of claim 6, wherein the feedback message and the request message have a same message structure, and wherein the message structure comprises a message type field used to distinguish between the feedback message and the request message.

8. The method of claim 1, wherein a field area and a data area are set in the request message, wherein the field area comprises a service header field and a control header field, wherein the service header field comprises the acceleration type identifier, and wherein the data area is used to carry the service data.

9. The method of claim 1 wherein an aging switch and an aging time are further configured in the inter-group routing table, and wherein the method further comprises when the aging switch of the inter-group routing table is enabled and the aging time elapses, reporting, by the inter-group router, to the host, to request the host to configure a new inter-group routing table.

10. The method of claim 4, wherein an aging switch and an aging time are further configured in the intra-group routing table, and the method further comprises when the aging switch of the intra-group routing table is enabled and the aging time elapses, reporting, by the intra-group router, to the host, to request the host to configure a new intra-group routing table.

11. A data processing apparatus applied to a scenario in which service data sent by a host is accelerated, wherein the data processing apparatus comprises:
a receiver, configured to receive a request message originated at a host service layer of the host and transparently transmitted to the data processing apparatus through a host driver of the host without the host driver parsing or modifying content of to-be-acceleratedly-processed service data of the request message, wherein the request message comprises at least one acceleration type identifier in addition to the to-be-acceleratedly-processed service data, and wherein each acceleration type identifier corresponds to one type of accelerated processing; and
a processor coupled to the receiver and configured to perform at least one type of accelerated processing in a one-to-one correspondence with the at least one acceleration type identifier on the service data received by the receiver.

12. The data processing apparatus of claim 11, wherein the request message comprises multiple acceleration type identifiers, wherein the request message further comprises acceleration sequence identifiers in a one-to-one correspondence with each acceleration type identifier, wherein the acceleration sequence identifiers are used to indicate an acceleration processing order, and wherein the processor is further configured to perform accelerated processing corresponding to each of the multiple acceleration type identifiers on the service data according to the order indicated by the acceleration sequence identifiers.

13. The data processing apparatus of claim 11, wherein the processor comprises an inter-group router and at least one acceleration processing group configured to perform accelerated processing on the service data, wherein the inter-group router comprises an inter-group routing table, wherein the inter-group routing table comprises a correspondence between an acceleration type identifier and an acceleration processing group, wherein the inter-group router is configured to:
receive the request message;
parse the request message to obtain the acceleration type identifier; and
forward the request message to a destination acceleration processing group according to the acceleration type identifier and the inter-group routing table.

14. The data processing apparatus of claim 13, wherein the acceleration processing group comprises a parser, an intra-group router, and at least one acceleration processor, wherein the at least one acceleration processor is configured to perform different types of accelerated processing on a same service, wherein the parser is configured to parse the request message, wherein the parser is further configured to cache the service data, wherein the parser is further configured to generate, according to parsing result, an internally forwarded message that comprises the acceleration type identifier and a cache address of the service data, wherein the parser is configured to send the internally forwarded message to the intra-group router, wherein the intra-group router comprises an intra-group routing table, wherein the intra-group routing table comprises a correspondence between an acceleration type identifier and an acceleration processor, wherein the intra-group router is configured to send the internally forwarded message received from the parser to a destination acceleration processor according to the acceleration type identifier and the intra-group routing tablet, and wherein the acceleration processor is configured to obtain the service data according to the cache address comprised in the internally forwarded message received from the intra-group router, and perform accelerated processing on the service data.

15. The data processing apparatus of claim 14, wherein when the internally forwarded message comprises acceleration sequence identifiers, the acceleration processor is further configured to cache acceleratedly processed service data to generate cached data, wherein the processor is configured to notify the intra-group router, wherein after receiving a notification sent by the acceleration processor, the intra-group router is further configured to send the internally forwarded message to a next destination acceleration processor according to the acceleration sequence identifiers to enable the next destination acceleration processor to perform accelerated processing on the cached data cached by the destination acceleration processor until the end of an acceleration order indicated by the acceleration sequence identifiers.

16. The data processing apparatus of claim 14, wherein the acceleration processor is further configured to cache processed service data, wherein when all the service data is acceleratedly processed, the intra-group router is further configured to read the processed service data cached by the acceleration processor, generate a feedback message corresponding to the request message according to the processed service data, and send the feedback message to the inter-group router, so that the inter-group router sends the feedback message to the host.

17. The data processing apparatus of claim 16, wherein the feedback message and the request message have a same message structure, and the message structure comprises a message type field used to distinguish between the feedback message and the request message.

18. The data processing apparatus of claim 11, wherein a field area and a data area are set in the request message, the field area comprises a service header field and a control header field, the service header field comprises the acceleration type identifier, and the data area is used to carry the service data.

19. The data processing apparatus of claim 13, wherein an aging switch and an aging time are further configured in the inter-group routing table, and wherein when the aging switch of the inter-group routing table is enabled and the aging time elapses, the inter-group router is further configured to report to the host to request the host to configure a new inter-group routing table.

20. The data processing apparatus of claim 14, wherein an aging switch and an aging time are further configured in the intra-group routing table, and wherein when the aging switch of the intra-group routing table is enabled and the aging time elapses, the intra-group router is further configured to report to the host to request the host to configure a new intra-group routing table.

\* \* \* \* \*

UNITED STATES PATENT AND TRADEMARK OFFICE
CERTIFICATE OF CORRECTION

PATENT NO. : 10,432,506 B2
APPLICATION NO. : 15/824032
DATED : October 1, 2019
INVENTOR(S) : Xianbo Chen, Honghui Yuan and Binbin Yao It is certified that error appears in the above-identified patent and that said Letters Patent is hereby corrected as shown below:

In the Claims

Claim 9, Column 21, Line 1: "claim 1" should read "claim 3"

Claim 11, Column 21, Line 19: "a receiver, configured to" should read "a receiver configured to"

Claim 14, Column 22, Line 19: "tablet, and wherein" should read "table, and wherein"

Signed and Sealed this
Nineteenth Day of November, 2019

Andrei Iancu
*Director of the United States Patent and Trademark Office*